UNITED STATES PATENT OFFICE.

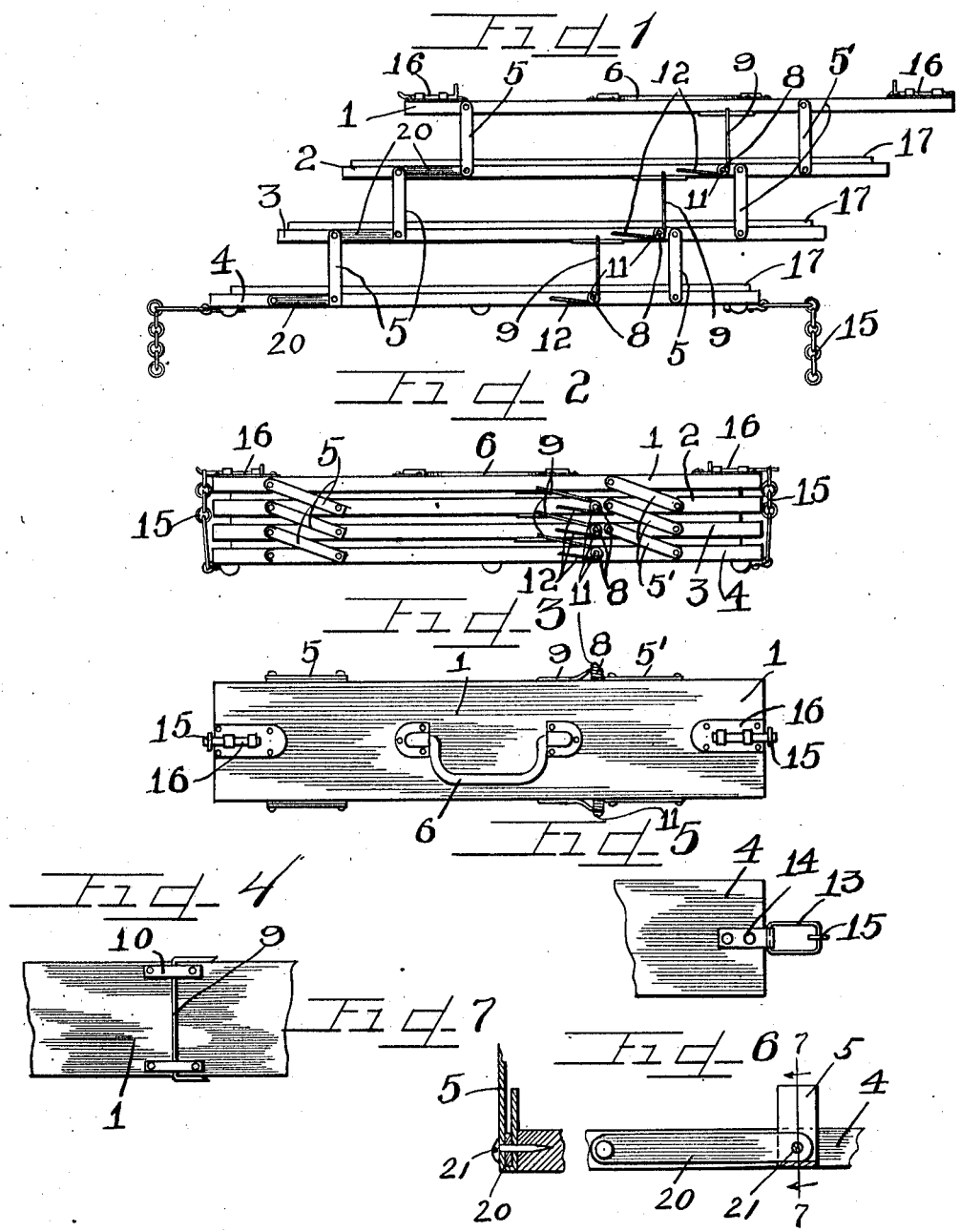

JOHN E. HUGHES, OF CHICAGO, ILLINOIS.

TIE HOLDER AND PRESS.

1,004,264.  Specification of Letters Patent.  Patented Sept. 26, 1911.

Application filed July 16, 1910. Serial No. 572,288.

*To all whom it may concern:*

Be it known that I, JOHN E. HUGHES, a citizen of the United States, and a resident of the city of Chicago, in the county of Cook and State of Illinois, have invented certain new and useful Improvements in Tie Holders and Presses; and I do hereby declare that the following is a full, clear, and exact description of the same, reference being had to the accompanying drawings, and to the numbers of reference marked thereon, which form a part of this specification.

The object of this invention is to afford a cheap, simple, durable and effective, as well as ornamental tie holder in which any desired number of ties may be contained and preserved from injury or damage and also pressed while so contained therein.

Various devices for the purpose of holding ties have been heretofore used but such, as a rule, do not press the tie as well as afford a container for the same.

The primary object of this invention is to afford a container and press affording a plurality of compartments in each of which one or more ties may be contained and in which the ties are subjected to the same pressure independently of the number of ties in each compartment.

The invention consists in the matters hereinafter described and more fully pointed out and defined in the appended claims.

In the drawings: Figure 1 is a side elevation of a device embodying my invention, showing the container fully opened. Fig. 2 is a similar view showing the container and press fully closed. Fig. 3 is a top plan view thereof. Fig. 4 is a fragmentary view illustrating the means for connecting the loop or band of the spring with the successive leaves of the container. Fig. 5 is a fragmentary bottom plan view of a part of the closing device. Fig. 6 is a fragmentary sectional view of one part of my invention. Fig. 7 is a section on line 7—7 of Fig. 6.

As shown in said drawings: A plurality of leaves indicated by 1, 2, 3, and 4, are shown of equal length and width and constructed of any desired material, though conveniently of wood or of metal. Said leaves are hinged or pivotally connected together in parallel relation by means of front and rear links 5—5', of equal length pivoted to adjacent leaves, as shown in Figs. 1 and 2, and arranged in stepped relation, as shown in Fig. 1, when the device is fully opened so that when the device is closed, as shown in Fig. 2, the ends of the leaves are brought into alinement. The lower ends of the links 5 are bent inwardly and upwardly around the guide and stop links 20 and are pivotally secured to the levers by pins 21. As shown in Figs. 6 and 7, the links 20 serve as a stop for the links 5 when the leaves are elevated and swung outwardly to their outer limits, as shown in Fig. 1.

As shown, a handle 6, is provided on the upper leaf 1, and engaged on each adjacent pair of leaves is a spring 8, comprising a wire bent to afford a coil on each side of one of the lower leaves and an upwardly directed loop 9, engaged across the next upper leaf on the under side thereof by means of suitable clips or plates 10, engaged thereto to confine said loop to the leaf.

Extending through the coil on each side of each lower leaf is a pin 11, whereby the coil is confined to said leaf and the extremities of the wire affording the spring are likewise permanently engaged on said leaf, as shown in Figs. 1 and 2, so that when the leaves are brought together, as shown in Fig. 2, said springs are under tension. When the leaves are released, said springs act to throw the same apart and to support the leaves in upright position, as shown in Fig. 1.

Means are provided for clamping the leaves in pressing relation. For this purpose, as shown, an oblong link 13, is pivotally engaged on each end of the bottom leaf 4, by means of a metallic loop or strap 14. A chain 15, is engaged in said oblong link and secured on each end of the upper leaf 1, is a bolt 16, upon which, when projected, any of the links of said chain may be engaged, as shown in Fig. 2, to hold the device closed.

When it is desired to release the leaves, the bolts are drawn inwardly, thus forcing the links therefrom, whereupon the springs act to immediately throw the leaves upwardly to the position shown in Fig. 1, thus exposing the ties 17, which preferably, may be inserted in a suitable wrapper or envelop before placing the same in the press.

Obviously, independently of the number of ties in any one compartment, equal pressure is exerted upon all the contents of the container, and when opened, any and all the ties therein are instantly exposed for selection and use.

I have shown but one (and that the preferred) form of my invention. I therefore do not purpose limiting this application for patent otherwise than necessitated by the prior art, as numerous details of construction may be modified without departing from the principles of this invention.

I claim as my invention:

1. A holder and press embracing a plurality of flat leaves hingedly connected together, springs acting normally to separate the leaves, links pivotally engaged on each end of the bottom leaf, a chain secured on each link and bolts secured on each end of the top leaf adapted to engage in the corresponding chain to firmly engage said leaves in pressing relation.

2. A device of the class described embracing a plurality of leaves, links of equal length pivoted to the adjacent leaves near their ends to hold the same in parallel relation, springs engaging said leaves and acting to hold the leaves separated, and means acting to engage said leaves in closed position.

3. A holder and press of the class described embracing substantially parallel leaves hingedly connected together, springs acting to hold the leaves separated, a bolt on each end of the upper leaf, a flexible connection on each end of the lower leaf adapted to be engaged by the bolt, and acting to hold the leaves in closed relation.

4. A holder and press for ties embracing a plurality of flat, stiff leaves arranged together face to face in parallel relation, links hingedly connecting said leaves, a spring engaged on each adjacent pair of leaves and acting to separate the same comprising a wire bent to afford a coil on each side of one leaf, and an upwardly directed loop engaged on the under side of the other leaf, and a locking device carried in part on the upper leaf and in part on the bottom leaf and acting to hold said leaves in pressing relation when closed inwardly.

5. A device of the class described embracing a plurality of substantially parallel leaves hingedly connected together and a spring engaged on each adjacent pair of leaves acting normally to separate the leaves and arrange them in stepped relation for the display of the contents.

6. A device of the class described embracing a plurality of substantially parallel leaves hingedly connected together, springs engaged on the adjacent leaves and acting normally to separate and arrange the same in stepped relation, and a locking device acting to firmly engage said leaves in pressing relation.

7. A device of the class described embracing superposed leaves hingedly connected together, springs acting to hold said leaves separated, a locking device carried in part on the upper leaf and in part on the bottom leaf and acting to hold said leaves in closed relation and a handle secured on the upper leaf.

8. A holder and press embracing a plurality of leaves hingedly connected together, springs acting to separate the leaves, links of equal length pivoted to the adjacent leaves to hold the same in parallel relation, stops acting to limit the movement of said leaves, springs acting normally to separate the leaves, and a locking device acting to firmly engage said leaves in close relation.

In testimony whereof I have hereunto subscribed my name in the presence of two subscribing witnesses.

JOHN E. HUGHES.

Witnesses:
CHARLES W. HILLS, Jr.,
LAWRENCE REIBSTEIN.

---

Copies of this patent may be obtained for five cents each, by addressing the "Commissioner of Patents. Washington, D. C."